United States Patent [19]

Hashimoto et al.

[11] Patent Number: 5,132,985
[45] Date of Patent: Jul. 21, 1992

[54] SPREAD SPECTRUM RECEIVER

[75] Inventors: Takeshi Hashimoto; Yoshitaka Uchida, both of Tokyo, Japan

[73] Assignee: Clarion Co., Ltd., Tokyo, Japan

[21] Appl. No.: 725,530

[22] Filed: Jul. 3, 1991

[30] Foreign Application Priority Data

Jul. 4, 1990 [JP] Japan ................... 2-176685

[51] Int. Cl.$^5$ .......................................... H04L 27/30
[52] U.S. Cl. ................................. 375/1; 380/34; 375/80; 375/94; 375/96
[58] Field of Search ............... 375/80, 82, 94, 96

[56] References Cited

U.S. PATENT DOCUMENTS

| | | | |
|---|---|---|---|
| 3,391,344 | 7/1968 | Goldberg | 375/1 X |
| 4,112,372 | 9/1978 | Holmes et al. | 375/1 |
| 4,301,537 | 11/1981 | Roos | 375/1 |
| 4,485,477 | 11/1984 | Nossen | 375/1 |
| 4,736,390 | 4/1988 | Ward et al. | 375/1 X |
| 4,866,734 | 9/1989 | Akazawa et al. | 375/1 |
| 4,899,364 | 2/1990 | Akazawa et al. | 375/1 |
| 4,924,188 | 5/1990 | Akazawa et al. | 375/1 X |
| 4,993,044 | 2/1991 | Akazawa | 375/1 |

FOREIGN PATENT DOCUMENTS 2-69033 3/1990 Japan .
2-207630 8/1990 Japan .

Primary Examiner—Bernarr E. Gregory
Attorney, Agent, or Firm—Flynn, Thiel, Boutell & Tanis

[57] ABSTRACT

A spread spectrum receiver has first and second correlators which each compare a received signal with a respective reference signal. The output of each correlator is routed through a respective band pass filter and a respective AGC amplifier to a respective detector circuit which converts the output of the amplifier into a respective base band signal. The ouput of each detector circuit is supplied to a respective peak value detecting and holding section, which detects and holds for a predetermined time period peak values from the associated detector circuit. Each peak value detecting and holding circuit supplies the peak value currently held therein through a respective low pass filter which serves as an integrator to a data comparing section and to an adding section. The adding section adds the two peak values, and supplies the sum to control inputs of each of the AGC amplifiers for purposes of gain control. The data comparing circuit compares the peak values and produces an output which is demodulated data from the received signal.

4 Claims, 5 Drawing Sheets

SPREAD SPECTRUM RECEIVER

FIELD OF THE INVENTION

The present invention relates to an improvement of a spread spectrum receiver.

BACKGROUND OF THE INVENTION

Heretofore various systems have been studied and developed as communication systems. As one of them there is known the spread spectrum communication system (hereinbelow called simply SS communication system) described e.g. in U.S. Pat. No. 4,866,734, U.S. Pat. No. 4,899,364, JP-A-Hei 2-69033 (corresponds to U.S. Pat. No. 4 993 044), etc.

In this SS communication system, on the transmitter side, a signal such as narrow band data, voice, etc. is spread in a wide band spectrum by means of a pseudo noise code (PN code) to be transmitter and on the receiver side the signal is reproduced by inversely spreading the wide band signal in the original narrow band signal by means of a correlator.

It is known that this SS communication system is resistant to external interference, noise, etc. (these are called mixed waves) and it has an excluding power corresponding to process gain (PG). The process gain used here can be given by a following formula;

$$PG = \frac{\text{radio frequency band width}}{\text{information speed}}$$

where the radio frequency band width described above means the band width of the transmitted SS signal and the information speed is a data speed in the base band channel.

As such an SS communication receiving device (hereinbelow called simply receiver) using the SS communication system resistant to mixed waves there is known a system disclosed in Japanese patent application No. Hei 1 (1989)-29538 published as (JP-A-Hei 2-207630, and corresponding to U.S. Pat. No. 5,048,052).

FIG. 6 shows the construction of a receiver by the system disclosed in the older application described above. In the figure, reference numeral 30 is a receiving antenna; 31, 36, 42, 42' are band pass filters; 32, 43, 43' are amplifiers; 33 is a local oscillator; 34, 40, 40' are mixers; 35 is an AGC amplifier; 37, 37' are PN code generators; 38 is a clock generator; 39 is an oscillator; 41, 41' are correlators (e.g. surface acoustic wave convolvers); 44, 44' are envelope detectors; 45, 45' are comparators; and 47 is a comparing demodulator.

The receiver by the system disclosed in the older application has been proposed in order to improve data demodulation characteristics by means of the correlators 41, 41', in which IF carrier signals BPSK-modulated with PN codes $PN_1$ and $PN_2$ are inputted in the correlators 41 and 41', respectively, as reference signals. In this way, since the PN code of the transmitter is outputted from the correlator 41 in the time region of $PN_1$ and from the correlator 41' in the time region of $PN_2$ in the form of respective correlation peak trains.

In a signal received by the receiver having the construction described above, if mixed waves are present in the frequency band of the SS signal, since spurious noise is superposed on the correlation spikes in the outputs of the correlators (outputs of the SAW convolvers), variations are produced in the correlation peaks and the spurious noise. Here the correlation peaks represent results of convolution integration of the SS signal in the received signal and the SS signal of the reference signal obtained by inverting it in time and the spurious noise represents results of convolution integration of the mixed waves in the received signal and the SS signal of the reference signal, as indicated in FIG. 7.

In such a state, only by using the comparators 45, 45', which serve only for shaping the waveform as by the system disclosed in the older application described above, since neither the level of the correlation peaks nor the level of the spurious noise can be detected, the level set for the threshold for separating the correlation peaks from the spurious noise, as indicated in FIG. 8, becomes uncertain and erroneous judgment can take place.

For this reason, the power of excluding mixed waves, which can be expressed by the process gain, is worsened in these comparators due to the fact that neither the level of the correlation peaks nor the level of the spurious noise can be detected.

OBJECT OF THE INVENTION

The object of the present invention is to provide an SS receiver capable of reducing influences of mixed waves, having a good communication quality.

SUMMARY OF THE INVENTION

In order to achieve the above object, an SS receiver according to the present invention is characterized in that it comprises a first correlator for making correlation between a received signal and a first reference signal and producing a correlation spike, when the correlation has been made; a second correlator for making correlation between a received signal and a second reference signal and producing a correlation spike, when the correlation has been made; first and second converting means for converting outputs of the first and second correlator into base band signals, respectively; first and second peak value holding means for holding peak values for every predetermined period of time in outputs of the first and the second converting means; and a data comparing section for comparing an output of the first peak value holding means with an output of the second peak value holding means to reproduce data.

The level of the correlation peaks is compared with the level of the spurious noise in the data demodulating section. As the result, if the level of the correlation peaks is higher than the level of the spurious noise, it is possible to reproduce data without errors.

DETAILED DESCRIPTION

Figure 1:
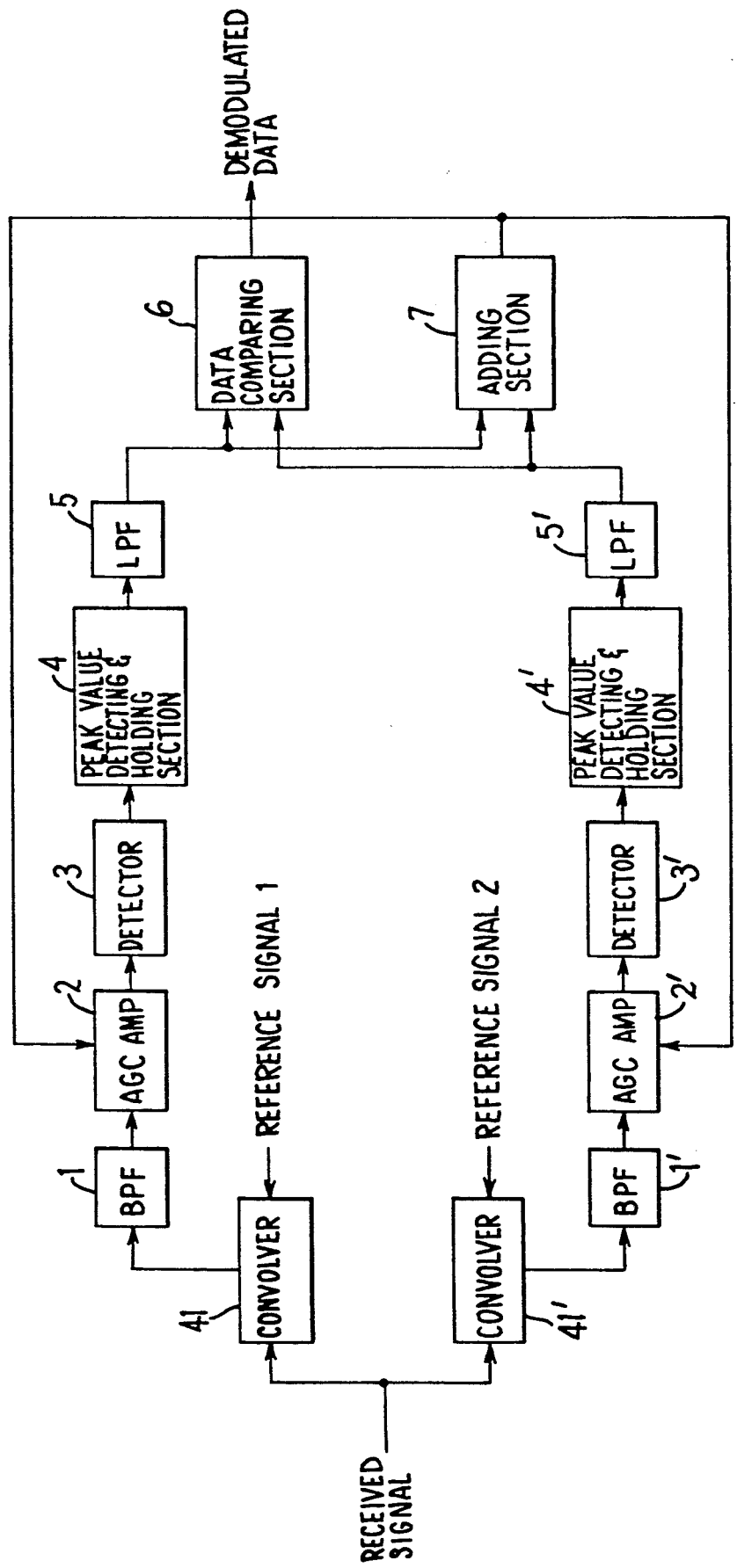
FIG. 1 is a block diagram indicating the principal part of an embodiment of the present invention.
Figure 6:
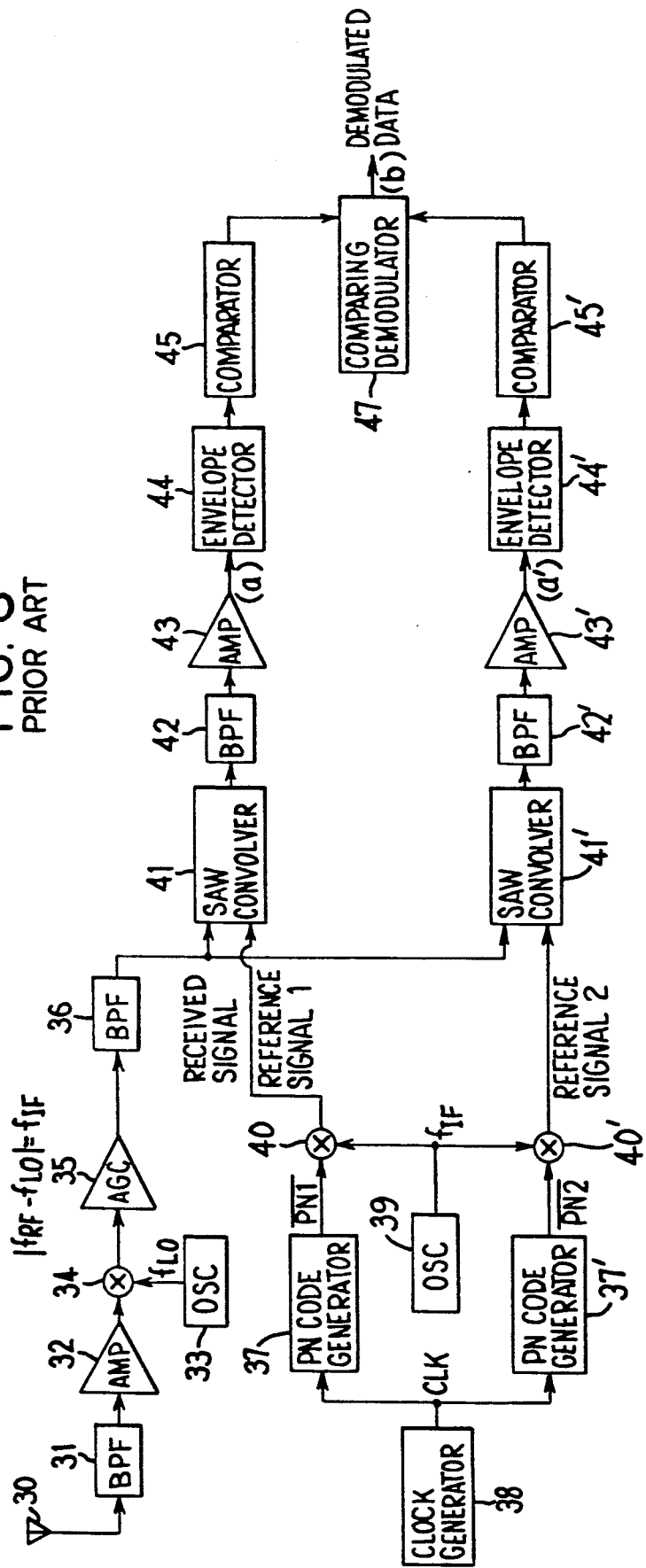
FIG. 6 is a block diagram of an SS receiver by the system disclosed in the older application.

Hereinbelow the present invention will be explained, referring to the embodiment indicated in the drawings. FIG. 1 shows an embodiment of the SS receiving device according to the present invention, in which since the construction before the correlators (e.g. SAW convolvers) 41, 41' is identical to the corresponding part in FIG. 6, it is omitted and reference numerals 1 and 1' are band pass filters; 2 and 2' are AGC amplifiers; 3 and 3' are detectors; 4 and 4' are peak value detecting and holding sections; 5 and 5' are low pass filters; 6 is a data comparing section; and 7 is an adding section.

Hereinbelow the operation in the embodiment constructed as indicated above will be explained.

The band pass filters 1 and 1' remove unnecessary components produced by non-linearity of the convolvers 41 and 41', respectively.

The amplifiers 2 and 2' with AGC control the gain on the basis of information on the level of the peak values from the adding section 7 so that the detectors 3 and 3' can respond satisfactorily thereto and in addition the level remains constant.

The detectors 3 and 3' covert the outputs on the convolvers, which are RF signals, into base band signals.

Figure 2:
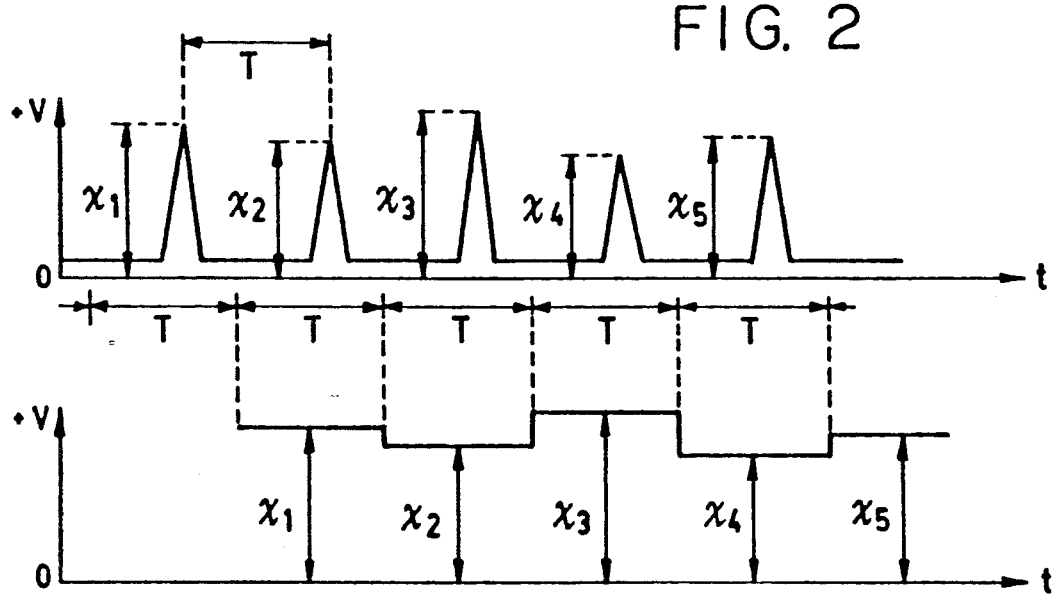
FIGS. 2, 3 and 5 are schemes of waveform for explaining the operation thereof.
Figure 7:
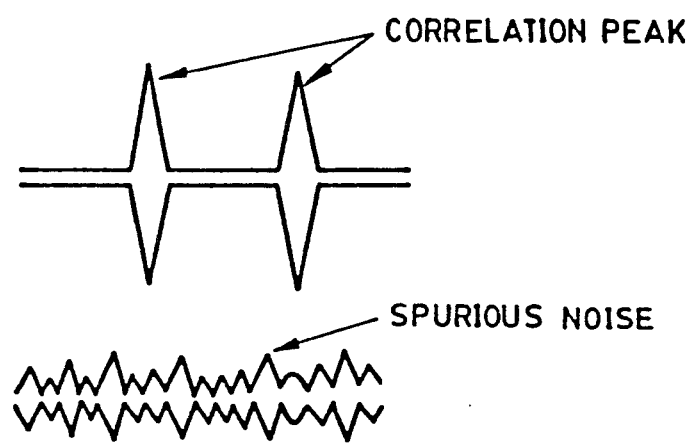
FIGS. 7 and 8 are schemes for explaining the operation thereof.
Figure 8:
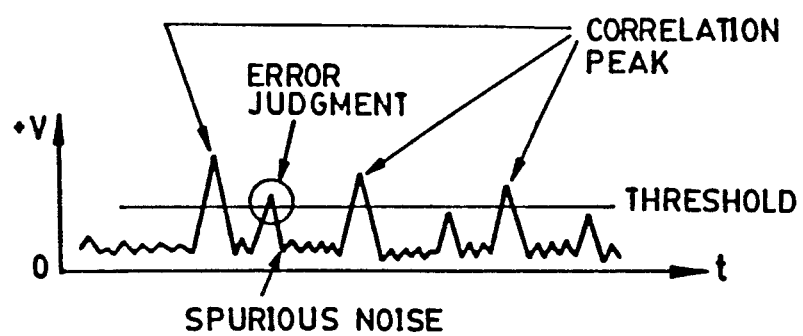

The peak value detecting and holding sections 4 and 4' detect the peak value of a correlation peak or peak values $x_1 \sim x_5$ of the spurious noise in a generation period T of the correlation peak to hold them, as indicated in FIG. 2. The peak values $x_1 \sim x_5$ held in this way are outputted in the succeeding period T. Further the detection of the peak values is effected in an asynchronous manner with the generation timing of the correlation peak.

Figure 3:
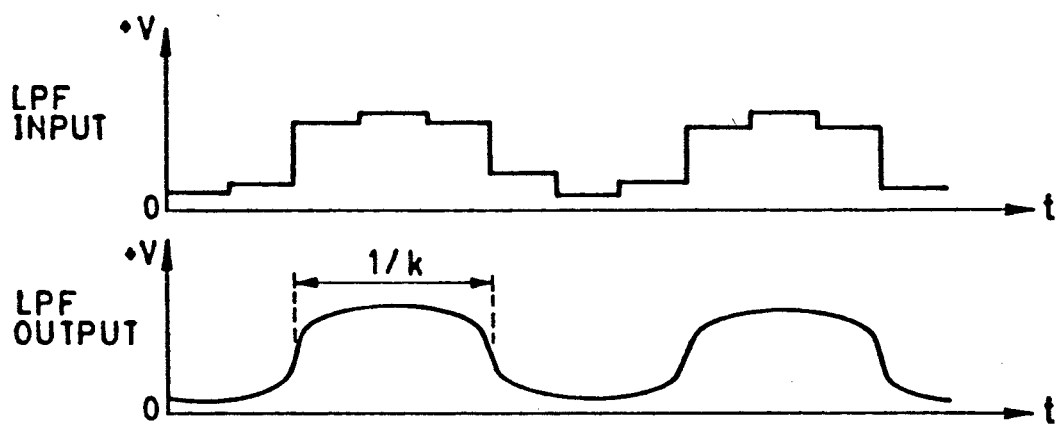

The low pass filters 5 and 5' are filters having a cut-off, which is about information transmission speed K, which filters integrate the peak values outputted by the peak value detecting and holding sections 4 and 4', as indicated in FIG. 3.

The data comparing section 6 compares the integrated peak values outputted by the low pass filters 5 and 5' by means of a comparator to reproduce data.

Figure 4:
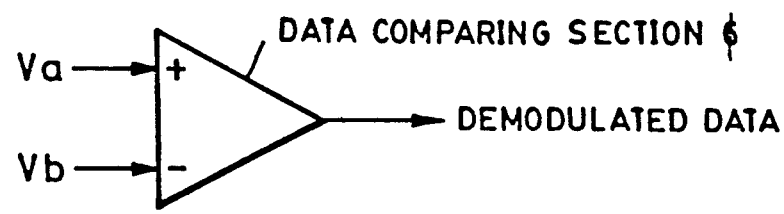
FIG. 4 is a scheme for explaining the operation of the data comparing section.

For example, denoting the output of the low pass filter 5 by Va and the output of the low pass filter 5' by Vb, when the comparing section 6 is constructed as indicated in FIG. 4, if the input condition is expressed by Va≧Vb, data "1" is outputted and if the input condition is expressed by Va<Vb, data "0" is outputted. Further, this data comparing section 6 may be any device, if the data are reproduced on the comparison of the heights of the levels, and thus it is not restricted to the construction described above.

The adding section 7 adds the integrated peak values outputted by the low pass filters 5 and 5' and the level information on the peak value thus added is fed back to the AGC amplifiers 2 and 2'.

Next, waveforms of different parts, in the case where the present receiver receives really a signal CSK-modulated, responding to the information data, will be explained. Here it is supposed that a correlation peak is outputted by the correlator 41 for the information data "1" in the received signal and inversely a correlation peak is outputted by the correlator 41' for the information data "0".

Figure 5:
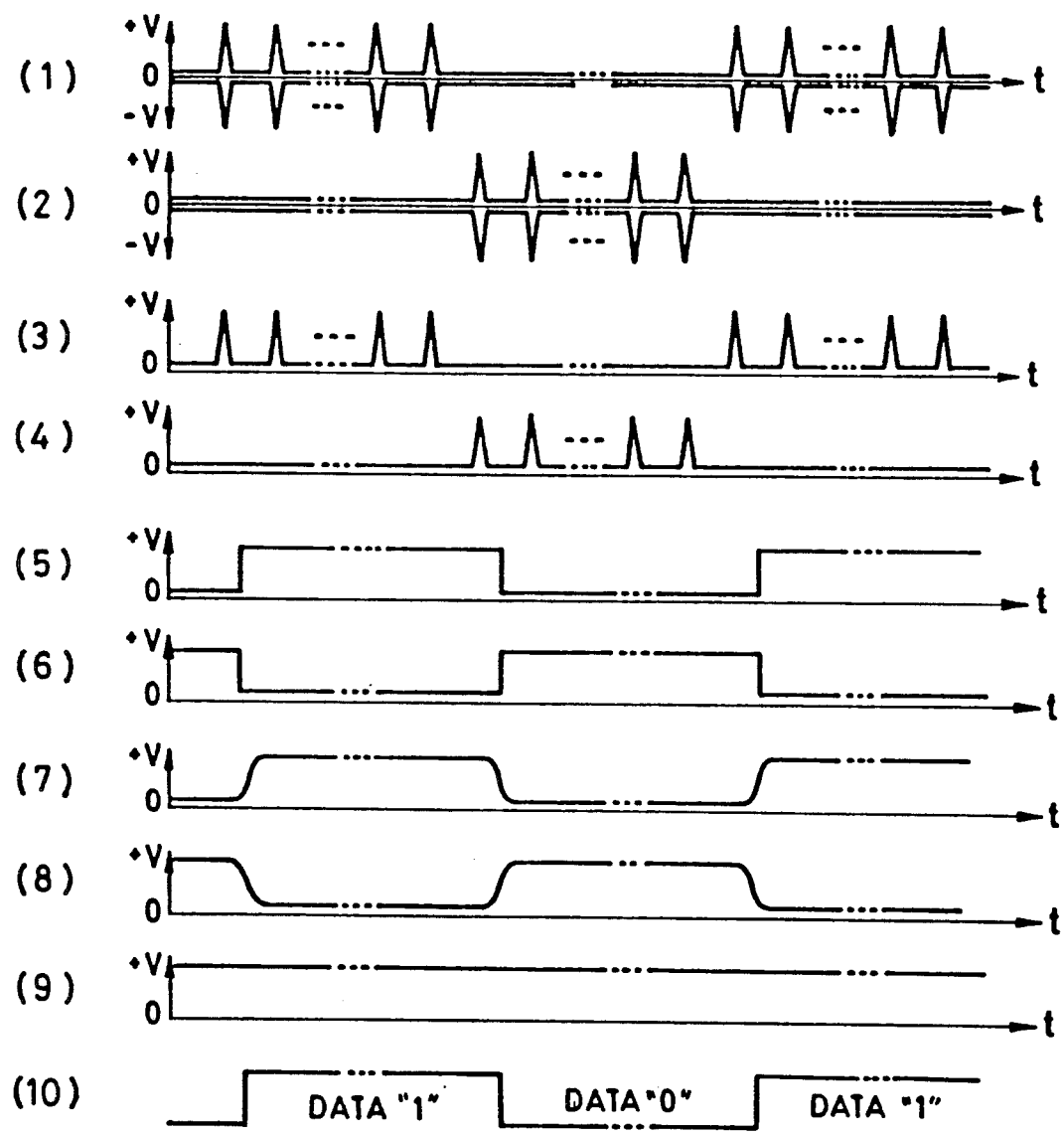

The waveforms of the different parts are indicated in FIG. 5-(1) to FIG 5-(10).

FIG. 5-(1) indicates the output of the AGC amplifier 2; FIG 5-(2) the output of the AGC amplifier 2'; FIG. 5-(3) the output of the detector 3; FIG. 5-(4) the output of the detector 3'; FIG. 5-(5) the output of the peak value detecting and holding section 4; FIG. 5-(6) the output of the peak value detecting and holding section 4'; FIG. 5-(7) the output of the low pass filter 5; FIG. 5-(8) the output of the low pass filter 5'; FIG. 5-(9) the output of the adding section 7; and FIG. 5-(10) the output of the data comparing section 6.

As explained above, according to the present invention, since the level of the correlation peaks is compared with the level of the spurious noise in the data comparing section. When the level of the correlation peaks after the integration is higher than the level of the spurious noise, the data can be reproduced without errors. In this way, no erroneous judgments of the correlation peaks and the spurious noise due to mixed waves take place and the power of reproducing data can be improved with respect to that obtained by the system described in the older application.

Further, since the integration is effected by means of the low pass filters having a cut-off, which is approximately equal to the speed of the data transmission, the correlation peaks and the spurious noise, which are held, are averaged and thus the power of reproducing data can be improved with respect to that obtained by the system described in the older application.

Still further, influences of the non-linearity of the detectors can be reduced by feeding back the level information on the peak value to the AGC amplifiers by the adding section so that the detectors respond satisfactorily thereto and controlling the gain so that the level is kept to be constant.

Furthermore, although the present system has been explained for the case where a signal obtained by CSK-modulating the PN code with the information data is received, the power of reproducing data can be improved similarly by using the present system also for the case where a signal FSK-modulated, OOK (ON/OFF KEYING)-modulated, etc. is received.

The embodiments of the invention in which an exclusive property or privilege is claimed are defined as follows:

1. A spread spectrum receiver comprising:
   first reference signal generating means for generating a first reference signal;
   second reference signal generating means for generating a second reference signal;
   a first correlator for making correlation between a received signal and said first reference signal and for producing a correlation spike when the correlation has been made;
   a second correlator for making correlation between said received signal and said second reference signal and for producing a correlation spike when the correlation has been made;
   first and second converting means for respectively converting outputs of said first and said second correlators into respective first and second base band signals;
   first and second peak value holding means for holding for a predetermined period of time peak values of outputs respectively from said first and said second converting means, said first peak value holding means supplying to an output thereof the peak value held therein, and said second peak value holding means supplying to an output thereof the peak value held therein; and
   a data comparing section for comparing said output of said first peak value holding means with said output of said second peak value holding means to reproduce data.

2. A spread spectrum receiver according to claim 1, further comprising first and second integrating means for respectively integrating outputs of said first and said second peak value holding means, said first integrating means being disposed between said first peak value holding means and said data comparing section, and said second integrating means being disposed between said second peak value holding means and said data comparing section.

3. A spread spectrum receiver according to claim 2, wherein:

each of said first and said second converting means includes a detector; and each of said first and said second integrating means includes a low pass filter.

4. A spread spectrum receiver according to claim 1, further comprising:

first and second AGC amplifiers, said first AGC amplifier being disposed between said first correlator and said first peak value holding means, and said second AGC amplifier being disposed between said second correlator and said second peak value holding means; and adding means for combining outputs of said first and said second peak value holding means.

* * * * *